United States Patent
Gudewer et al.

(10) Patent No.: US 9,742,224 B2
(45) Date of Patent: Aug. 22, 2017

(54) POLE SHOE OF A GENERATOR, PREFERABLY A GENERATOR OF A WIND TURBINE GENERATOR SYSTEM

(75) Inventors: Wilko Gudewer, Norden (DE); Arno Hildebrand, Wittmund (DE)

(73) Assignee: WOBBEN PROPERTIES GMBH, Aurich (DE)

(*) Notice: Subject to any disclaimer, the term of this patent is extended or adjusted under 35 U.S.C. 154(b) by 701 days.

(21) Appl. No.: 14/008,244

(22) PCT Filed: Mar. 23, 2012

(86) PCT No.: PCT/EP2012/055196
§ 371 (c)(1),
(2), (4) Date: Dec. 4, 2013

(87) PCT Pub. No.: WO2012/130752
PCT Pub. Date: Oct. 4, 2012

(65) Prior Publication Data
US 2014/0084742 A1    Mar. 27, 2014

(30) Foreign Application Priority Data
Apr. 1, 2011 (DE) .......................... 10 2011 006 682

(51) Int. Cl.
    H02K 3/32       (2006.01)
    H02K 1/18       (2006.01)
           (Continued)

(52) U.S. Cl.
CPC .............. *H02K 1/185* (2013.01); *H02K 1/08* (2013.01); *H02K 3/325* (2013.01); *H02K 3/52* (2013.01); *H02K 7/183* (2013.01); *H02K 7/1838* (2013.01)

(58) Field of Classification Search
CPC .. H02K 3/00; H02K 3/34; H02K 3/24; H02K 3/32; H02K 3/325; H02K 3/46; H02K 3/48; H02K 3/522
(Continued)

(56) References Cited

U.S. PATENT DOCUMENTS 2,852,711 A    9/1958   Derner et al.
3,445,702 A    5/1969   Silva
(Continued)

FOREIGN PATENT DOCUMENTS

AT            180982 B    2/1955
CN          1702944 A    11/2005
(Continued)

*Primary Examiner* — Tran Nguyen
(74) *Attorney, Agent, or Firm* — Seed Intellectual Property Law Group LLP

(57) ABSTRACT

The invention concerns a pole shoe, in particular of a generator, comprising a pole assembly which is of a laminated configuration, at least one winding arranged around the pole assembly, and a body which passes through the laminated pole assembly in the longitudinal direction and which has a plurality of transversely directed engagement locations, preferably at most three transversely directed engagement locations, into which a respective holding means can engage to fasten the pole shoe on a support, in particular the rotor or stator of a generator. The present invention further concerns a pole shoe, in particular of a generator, comprising a pole assembly which is of a laminated configuration, at least one winding arranged around the pole assembly, and an insulating means arranged between the pole assembly and the winding, wherein the insulating means has a fiber composite material.

14 Claims, 7 Drawing Sheets

(51) Int. Cl.
*H02K 1/08* (2006.01)
*H02K 3/52* (2006.01)
*H02K 7/18* (2006.01)

(58) Field of Classification Search
USPC ........... 310/194, 216.004, 216.009, 216.087, 310/216.058
See application file for complete search history.

(56) References Cited

U.S. PATENT DOCUMENTS

| | | | |
|---|---|---|---|
| 4,837,468 A | 6/1989 | Froment | |
| 6,590,310 B2* | 7/2003 | Takano | H02K 3/522 |
| | | | 29/596 |
| 7,166,949 B2* | 1/2007 | Okada | H02K 3/522 |
| | | | 310/194 |
| 7,663,287 B2* | 2/2010 | Haga | H02K 3/522 |
| | | | 310/260 |
| 7,830,061 B2* | 11/2010 | Matsuura | H02K 3/522 |
| | | | 310/194 |
| 8,314,528 B2* | 11/2012 | Shinohara | H02K 3/522 |
| | | | 310/194 |
| 2005/0189840 A1 | 9/2005 | Du et al. | |
| 2006/0119207 A1* | 6/2006 | Okada | H02K 3/522 |
| | | | 310/194 |
| 2008/0001505 A1 | 1/2008 | Habele | |
| 2008/0315710 A1 | 12/2008 | Morioka et al. | |
| 2009/0243421 A1* | 10/2009 | Matsuura | H02K 3/522 |
| | | | 310/215 |

FOREIGN PATENT DOCUMENTS

| | | |
|---|---|---|
| DE | 378328 C | 12/1923 |
| DE | 951 943 B | 11/1956 |
| DE | 1 911 596 U | 3/1965 |
| DE | 38 04 728 A1 | 8/1988 |
| DE | 198 59 065 A1 | 6/2000 |
| DE | 10 2006 029 628 A1 | 1/2008 |
| EP | 1 014 536 A2 | 6/2000 |
| EP | 1 496 596 A1 | 1/2005 |
| EP | 1 517 426 A1 | 3/2005 |
| FR | 392 926 A | 12/1908 |
| GB | 629063 A | 9/1949 |
| JP | 51-148602 U | 11/1976 |
| JP | 52-64603 A | 5/1977 |
| JP | 5-3653 A | 1/1993 |
| JP | 11089128 A * | 3/1999 ............... H02K 3/34 |
| JP | 200195188 A | 4/2001 |
| JP | 2002-247789 A | 8/2002 |
| JP | 2003-111329 A | 4/2003 |
| JP | 2008-109817 A | 5/2008 |
| JP | 2010153120 A | 7/2010 |
| JP | 2010261030 A | 11/2010 |
| RU | 2253042 C1 | 5/2005 |

* cited by examiner

POLE SHOE OF A GENERATOR, PREFERABLY A GENERATOR OF A WIND TURBINE GENERATOR SYSTEM

BACKGROUND

Technical Field

The present invention concerns a pole shoe, in particular a pole shoe of a generator.

Description of the Related Art

A pole shoe is a component that includes a material of high permeability such as for example iron. The pole shoe serves to cause the magnetic field lines of a permanent magnet or a winding to issue in a defined form, and to distribute same. By way of example in an electric motor the magnetic exciter field is distributed to the armature in the form of a segment of a circle by a pole shoe. That homogenizes the variation in the flux density along the revolution of the armature. In that case not only can the stator have pole shoes, but also the armature of dc motors or the rotor (rotor member) of turbo generators. The pole shoes of electrically excited ac/three-phase machines as well as the armature of dc motors are in that case generally of a laminate nature to avoid eddy current losses.

Wind power installations involve the use of three-phase asynchronous generators or three-phase synchronous generators which respectively have pole shoes in the rotor or stator. Because of the increasing size of the generators of wind power installations and the increasing loading that this entails the known configurations of pole shoes are encountering their load limits from mechanical and thermal points of view.

BRIEF SUMMARY

One or more embodiment of the present invention is directed to a pole shoe, in particular of a generator, in particular a generator of a wind power installation, from mechanical and/or thermal points of view.

There is provided in one embodiment a pole shoe, in particular of a generator, having a pole assembly which is of a laminated configuration, at least one winding arranged around the pole assembly, and a body which passes through the laminated pole assembly in the longitudinal direction thereof and which has a plurality of transversely directed engagement locations, preferably at most three transversely directed engagement locations, into which a respective holding means can engage to fasten the pole shoe on a support, in particular the rotor or stator of a generator.

It is advantageous in that respect that the number of fastening locations for fastening the pole shoe to the support are minimized. Those connecting locations have disturbance effect on the support as it typically has corresponding bores, bolts, screws or the like. The design configuration of the support is also restricted by the provision of the fastening locations for the pole shoe.

Therefore according to one embodiment of the invention there are provided preferably at most three engagement locations in the pole assembly of the pole shoe. That provides that the support can be freer in its design and the pole shoe can be mounted there at a lower level of complication and expenditure. Also for example cooling in the support can act better on the pole shoe as the transfer of heat is disturbed by fewer fastening locations. The cooling can also be arranged closer to the pole shoe in or under the support as it is less disturbed in its arrangement, by virtue of fewer fastening locations. In that respect there are preferably three engagement locations in the pole assembly, but particularly preferably it is also possible to provide only two engagement locations or a single engagement location.

In an aspect of the invention the at most three engagement locations are provided at the ends and optionally in the center of the pole assembly. That makes it possible to achieve stable fastening of the pole assembly, even with a few engagement locations and fastening means.

In accordance with a further aspect of the invention the at most three engagement locations are so provided that heat can be discharged from the pole shoe to at least one cooling region in the support, in particular in the rotor or stator of a generator, by way of the surfaces of the pole shoe between the engagement locations. In that way, by virtue of a reduction in the engagement locations of the pole assembly in conjunction with cooling in the support, it is possible to achieve improved pole shoe cooling.

In an aspect of the invention the holding means are screws, in particular of size M24. Fastening can be effected by those screws in a simple fashion. A secure fastening can also be achieved by the use of thicker screws such as for example M24 screws.

The present invention also concerns a pole shoe, in particular of a generator, comprising a pole assembly which is of a laminated configuration, at least one winding arranged around the pole assembly, and an insulating means arranged between the pole assembly and the winding. The insulating means produces an adhesive connection between the pole assembly and the winding.

In that respect it is advantageous that the use of the insulating means as an adhesive connection results in a secure hold for the winding in relation to the pole assembly so that for example centrifugal forces occurring in the rotor of a generator, acting on the pole shoe, can lead less to displacement of the windings with respect to the pole assembly.

In an aspect of the invention the insulating means has a fiber composite material and/or a glass fiber-reinforced plastic (GRP). Such insulating means are flexible, stable and can bear a loading. Fiber composite materials or glass fiber-reinforced plastics (GRP) are non-conducting and thus serve for electrical insulation. They are good thermal conductors and thus, when used as insulating means in a pole shoe, can transfer the heat from the windings to the laminate plates from where the heat can be discharged by cooling measures. In addition fiber composite material or glass fiber-reinforced plastic (GRP) can be impregnated with adhesive or coated with adhesive to form an adhesive connection between the windings and the laminate pole assembly of the pole shoe.

In a further aspect of the invention the fiber composite material has meta aramid fibers. Such fibers are also known under trademark names, Nomex or Kevlar. Those fibers, of a comparatively low weight and of small thickness, are very stable in comparison with materials which are conventionally used as insulating means.

One embodiment of the present invention also concerns a pole shoe, in particular of a generator, comprising a pole assembly which is of a laminated configuration, at least one winding arranged around the pole assembly, and at least one end portion provided at at least one end of the pole assembly in the longitudinal direction thereof between the pole assembly and the winding. The end portion has rounded edges to provide an edge-free transition between the end portion and the pole assembly for the winding.

It is advantageous in that respect that damage to the windings and the insulating means at the edges of the pole assembly can be avoided by the rounded-off end portion.

In an aspect of the invention the end portion and/or a side portion is/are of a concave configuration, that is to say curved inwardly, to accommodate the winding in the recess of the concavity. That reduces or avoids the winding being displaced upwardly, for example by centrifugal forces acting thereon.

In a further aspect of the invention the end portion and/or the side portion has/have at least one projecting edge extending parallel to the winding. That edge can alternatively or additionally prevent the windings from moving up beyond the upper end of the pole assembly.

In an aspect of the invention the end portion is provided on the pole assembly fitted on an element. That element makes it possible to make a connection between the outermost pole plate of the pole assembly and a connection for the pole plates in the longitudinal direction, which then in turn can be terminated smoothly and flush by the end portion in order to ensure a smooth surface in relation to the insulating means and the winding. The end portion also has an electrically insulating effect as it defines a spacing between the windings and pole assembly. Preferably a spacing of 20 mm is to be provided by the end portion to avoid surface leakage currents.

BRIEF DESCRIPTION OF THE SEVERAL VIEWS OF THE DRAWINGS

Embodiments by way of example and advantages of the invention are described in greater detail hereinafter by with reference to the following Figures.

DETAILED DESCRIPTION

Figure 1:
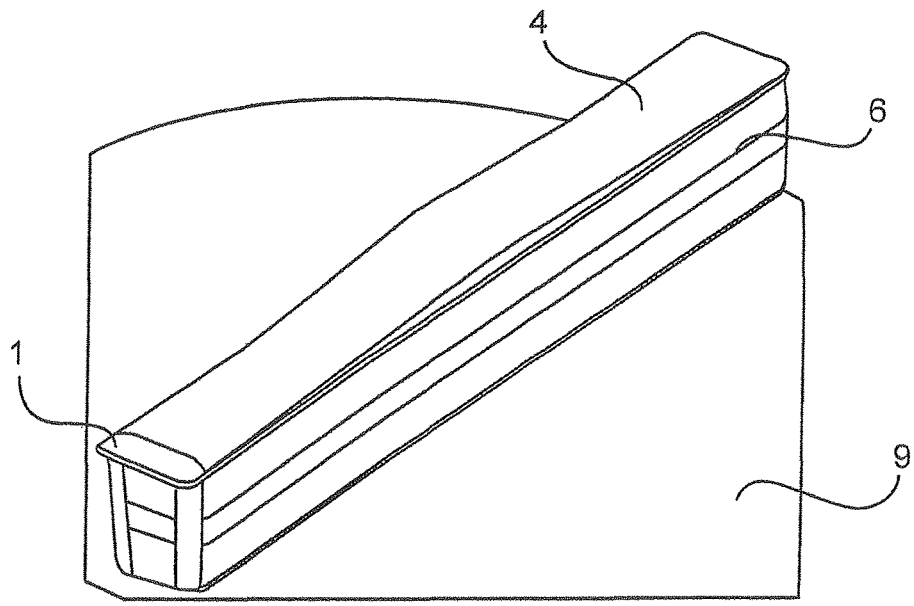
FIG. 1 shows a perspective view of a pole shoe in an assembled condition according to one embodiment.

FIG. 1 shows a perspective view of a pole shoe in an assembled condition. In this view it is possible to see the upper region of the pole assembly 4 which is enclosed by a winding 6 or also a plurality of windings 6. The upper ends of the respective end portion 1 can be seen at the two ends of the pole assembly 4. The pole shoe is shown fastened on a support 9. The support 9 can be for example the rotor or stator of a generator.

Figure 2:
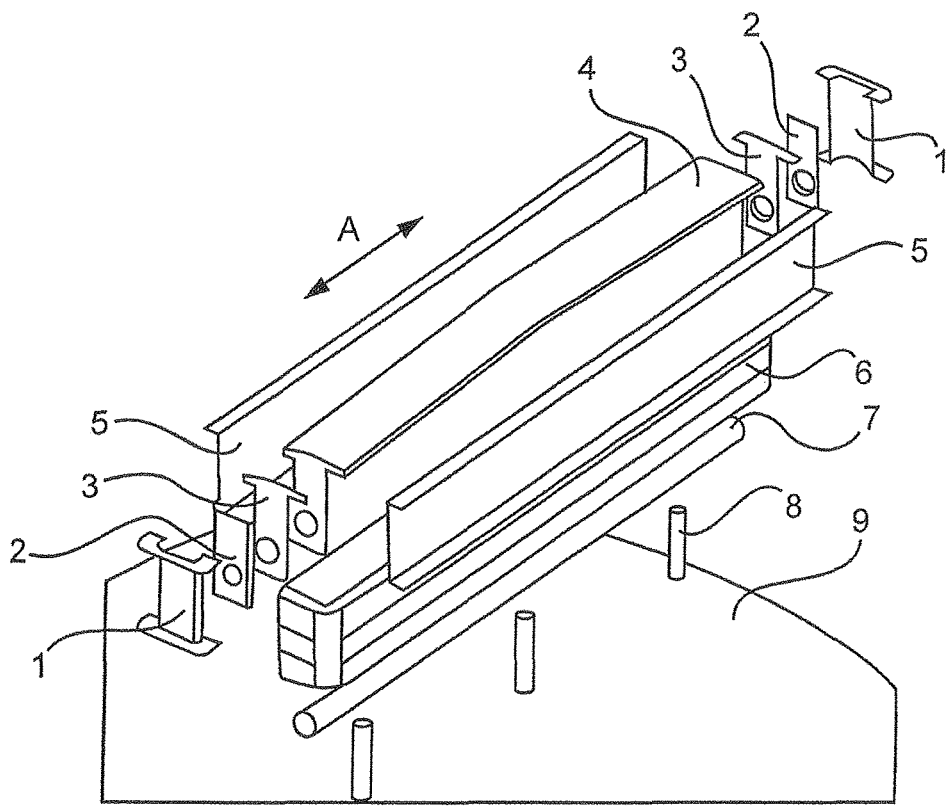
FIG. 2 shows a perspective view of the pole shoe of FIG. 1 in the form of an exploded view.
Figure 3:
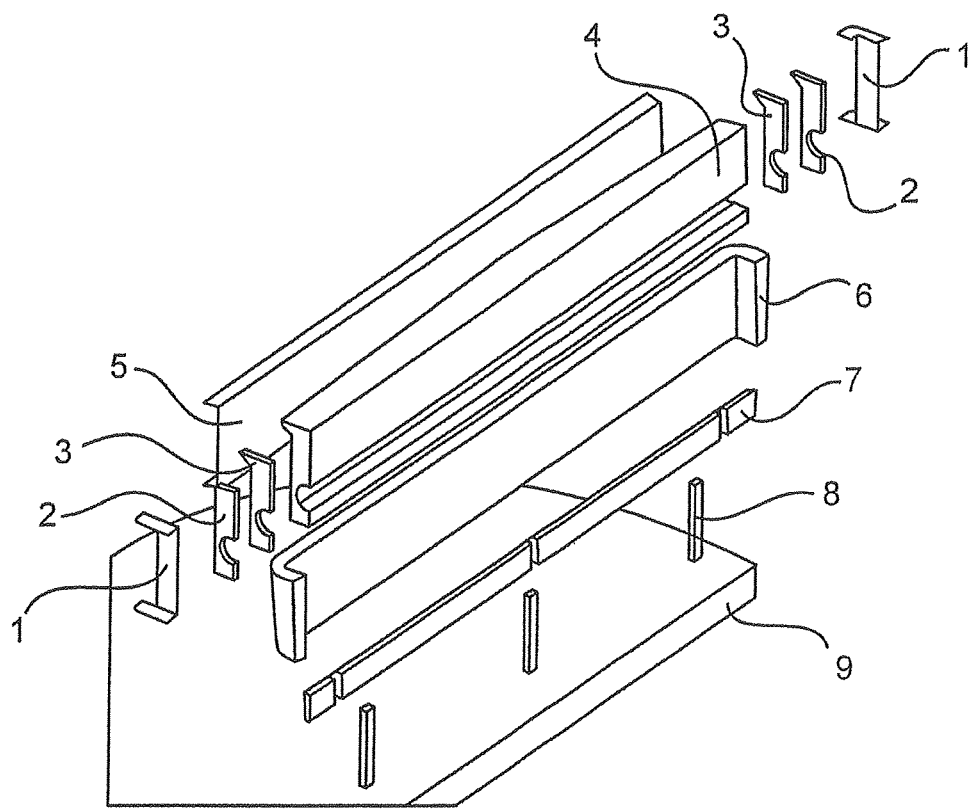
FIG. 3 shows a perspective sectional view of the pole shoe of FIG. 1 in the form of an exploded view.
Figure 4:
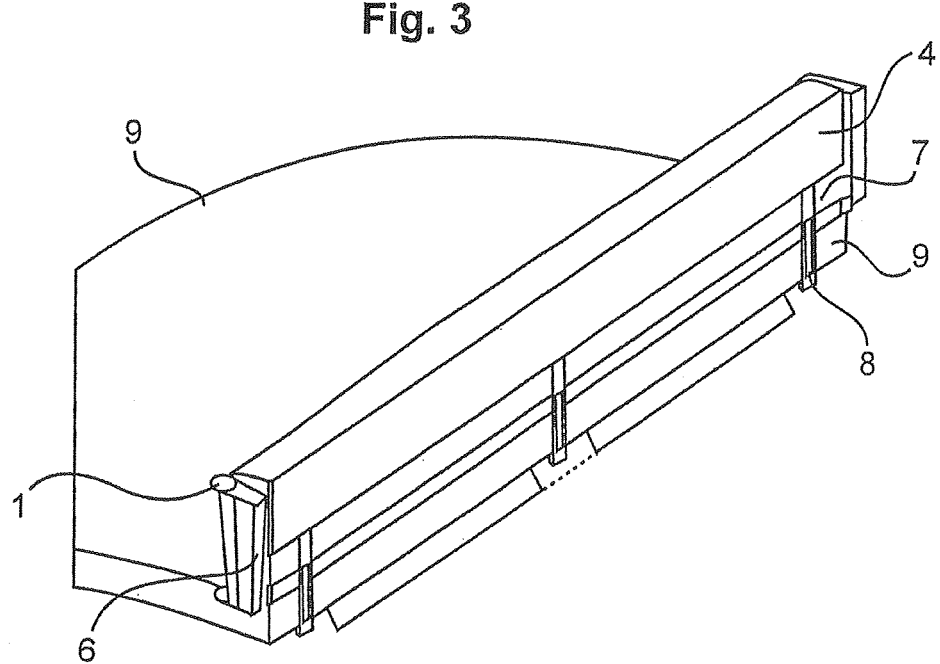
FIG. 4 shows a perspective sectional view of the pole shoe of FIG. 1 in the assembled condition.

FIG. 2 shows a perspective view of a pole shoe in the form of an exploded view. FIG. 3 shows a perspective sectional view of the pole shoe in the form of an exploded view. FIG. 4 shows a perspective sectional view of the pole shoe in the assembled condition.

The interior of the pole shoe is formed by a plurality of lamination plates which together form the iron core of the pole shoe in the form of the pole assembly 4. Eddy currents within the pole shoe can be avoided or at least reduced by virtue of the laminated configuration of the pole shoe. In this case the lamination plates are joined to each other in the longitudinal direction A to form the pole assembly 4. At its upper edge, that is to say at its side remote from the support 9, the pole assembly 4 is formed with a projection which protrudes laterally beyond the windings 6 in order to hold same in the radial direction with respect to the support 9.

FIG. 2 further shows a U-shaped side portion 5 which can be provided between the pole assembly 4 and the windings 6. The side portion 5 is of U-shaped configuration, that is to say with two angled edges at top and bottom, in order also to project laterally beyond the windings 6 and hold same in the radial direction with respect to the support 9. In this case only the upper edge of the U-shaped side portion 5 is required to counteract radial centrifugal forces, for which reason the U-shaped side portion 5 could also be L-shaped, that is to say with an angled edge at the top.

Thus such a projection which protrudes beyond the windings 6 can be formed either by the upper edge of the pole assembly 4 or by the upper edge of the U-shaped side portion 5 or both elements 4, 5 can be jointly provided with corresponding projections.

An insulating means is provided around the laminated pole assembly 4. The winding 6 is arranged around the insulating means. The insulating means electrically insulates the pole assembly 4 and the winding 6 from each other. In addition the insulating means can contribute to a good transfer of heat from the windings 6 through which current flows to the pole assembly 4 and as an adhesive insulating material can promote the stability of the windings 6 with respect to the pole assembly 4, that is to say in addition to or alternatively to the upper edges of the pole assembly 4 and/or the upper edge of the side portion 5 it can counteract radial forces.

The insulating means is not shown in the view in FIG. 2, but its arrangement and configuration correspond to that of the U-shaped side portion 5 to completely insulate the winding 6 with respect to the support 9 and the pole assembly 4, to ensure heat transfer from the windings 6 to the support 9 and the pole assembly 4 and improve the stability of the windings 6 with respect to the pole assembly 4.

Provided at the two ends of the pole assembly 4 in the longitudinal direction A, that is to say at the end faces thereof, is a respective arrangement of various elements 1, 2, 3 which are described and considered in greater detail with reference to FIGS. 5 to 11d. In that respect the elements 1, 2 and 3 serve to accommodate and guide the winding 6 at the respective end of the pole assembly 4.

In addition the pole shoe has a body 7 which for example can be in the form of a cylindrical pin 7. The pin 7 is passed in the longitudinal direction A through the pole plates of the pole assembly 4 to hold the plates together. In that case the pin 7 projects beyond the plates at the two ends of the pole assembly 4 to engage into at least one of the elements 1, 2, 3, see FIGS. 5 to 11d. It will be noted however that the pin 7 can also be of such a configuration that it terminates flush with the outermost plates of the pole assembly 4 at both or at least one end. The pin 7 is therefore to be referred to hereinafter as the longitudinal pin 7.

Engagement locations are provided in the longitudinal pin 7 in the transverse direction of the pole shoe in the direction of the support 9. For that purpose the corresponding plates of the pole assembly 4 have openings. Screws or bolts 8 can engage into those engagement locations of the longitudinal pin 7 through the openings in the pole assembly 4 which are in turn provided on the support 9. Those bolts 8 which engage transversely relative to the longitudinal direction A are therefore to be referred to as transverse bolts 8. If the support 9 is for example the outer belt 9 (belt 9) of a rotor of a generator then the pole shoe can be fastened thereon by the transverse bolts 8.

According to one embodiment of the invention the illustrated pole shoe has a longitudinal pin 7 with at most three transversely directed engagement locations. In that case for example two engagement locations can be arranged near the two ends of the pole shoe in such a way that the two engagement locations are spaced from each other far apart and the transverse bolts 8 can engage into the longitudinal pin 7 with a secure hold. Optionally a third transverse bolt 8 can engage into a third engagement location provided approximately centrally in the longitudinal pin 7 in the longitudinal direction A. That permits spacings between the transverse bolts 8, that are suitably far apart. In those intermediate spaces the pole shoe is in direct contact with the support 9 by way of the corresponding side of the pole assembly 4 so that this provides for direct conduction of heat from the pole shoe into the support 9.

That heat can be caused for example by the windings 6 which have current flowing therethrough, and in that respect can reach an extent such that that heat must be dissipated as well as possible to avoid overheating of and damage to the pole shoe. For that purpose, as many as possible and continuous contact surfaces between the pole assembly 4 and the support 9 are advantageous to dissipate the heat to the support 9. In that respect for example cooling can be provided in the support 9, which cooling preferably extends directly under the contact regions, that is to say between the transverse bolts 8.

Therefore it is advantageous and desirable to be able to fasten the pole shoe on the support 9 with as few transverse bolts 8 as possible as that increases the size of the regions in which cooling in the support 9 can be provided directly at the contact surfaces between the pole assembly 4 and the support 9. If for example hitherto pole shoes in the generators of wind power installations were fastened to the rotor with ten M12 screws as the transverse bolts 8, then according to one embodiment of the invention fastening can be effected by only for example three screws as the transverse bolts 8, which however can be in the form of M24 screws to achieve the same fastening security. That reduction in the transverse bolts 8 however is possible, with the same stability in respect of the fastening, only by virtue of the fact that the plates of the pole assembly 4 are held together by the longitudinal pin 7 in the longitudinal direction A.

Such a longitudinally extending pin 7 was not used hitherto, as stable fastening of the pole shoe 4 on the support 9 was possible even without the longitudinal pin 7, by means of the plurality of smaller M12 screws acting as the transverse bolts 8. If however fastening of the pole assembly 4 on the support 9 is effected with fewer transverse bolts 8, that leads to a low level of stability between the individual plates of the pole assembly 4, which is compensated again by the longitudinal pin 7. That means that the arrangement of the longitudinal pin 7 and the at most three transverse bolts 8 can afford comparable stability of the pole assembly 4 with respect to the support 9, as was hitherto achieved with for example ten smaller transverse bolts 8 arranged distributed over the length of the pole assembly 4. However, the free spaces, which are increased in size as a consequence, between the few individual transverse bolts 8, permit improved transfer of heat to the support 9 and thus permit an improved cooling option for the pole assembly 4 and therewith also the windings 6.

To improve that conduction of heat between the pole assembly 4 and the support 9, it is possible to provide a means for improving heat conduction such as for example a heat-conducting paste between the pole assembly 4 and the support 9.

It is further to be noted that conventionally the plates of the pole assembly 4 are connected together by way of a weld seam at the underside, that is to say the side of the pole assembly 4 that rests on the support 9. For that purpose, a corresponding recess is provided in the plates or is introduced into the assembled plates of the pole assembly 4. The weld material is then introduced into the recess, for example being applied thereto. If that weld seam is used in addition to the longitudinal pin 7 then an air-filled intermediate space can form in that recess between the weld material and the support 9, and that intermediate space worsens the conduction of heat between the pole assembly 4 and the support 9. Therefore in particular that intermediate space is to be filled with a means for improving heat conduction such as for example a heat-conducting paste to avoid a thermally insulating action on the part of the air enclosed in the recess.

According to one embodiment of the invention, a material which has a fiber composite material or a glass fiber-reinforced plastic (GRP) is used as the insulating means in the pole shoe. That material can be provided with an adhesive in order in that way to produce an adhesive connection between the pole assembly 4 and the winding 6. In that respect the insulating means is to be so provided that on the one hand it ensures electrical insulation and good thermal conductivity between the pole assembly 4 and the winding 6. At the same time on the other hand such an adhesive action is to be achieved between the pole assembly 4 and the winding 6, that the winding 6 is not movable with respect to the pole assembly 4. Such relative movement for example upon use of the pole shoe in the rotor of a generator can be caused by centrifugal forces. In that way, in the worst-case scenario, the winding 6 can come at least partially loose from the pole assembly 4 in the radial direction, that is to say perpendicularly to the support 9, whereby the pole shoe loses its effect or is at least reduced in that respect, and the surroundings can be damaged by the released winding 6.

In order to avoid such detachment in operation, in addition to further mechanical measures, it is possible to produce an adhesive connection by the insulating means such that the situation of detachment is reliably avoided even when high centrifugal forces and ongoing operation are involved, or at least the probability of such a situation arising can be reduced.

According to one embodiment of the invention it is further advantageous to use insulating means having good thermal conductivity in order to transfer the heat of the winding 6, which is caused by the exciter current, to the pole assembly 4 by way of the insulating means in the best possible fashion so that the heat can be dissipated from the pole assembly for example by way of the support 9 and the cooling means thereof, from the pole shoe. For that purpose optionally a heat-conducting paste or the like can also be provided between the pole assembly 4 and the insulating means and/or between the insulating means and the winding 6.

According to one embodiment the invention the insulating means used is a fiber composite material comprising for example aramid fibers. Aramid fibers are fibers of aramids or aromatic polyamides (polyaramides). They are marketed for example under the trademark names "Nomex" and "Kevlar" by DuPont. Those fibers include the meta aramid fibers which are used especially for fire-proofing.

One application of such aramid fibers as aramid paper is the use as electric insulation, for example in electric motors, or as layer insulation in transformers. That paper is very thin and at the same time highly stable. Because of its paper properties, it can be impregnated for example with resin like for example epoxy resin or it can also be coated with adhesive to acquire an adhesive surface.

Thus it is possible by means of an aramid paper to provide an insulating means which, being of small thickness and low weight, can withstand high mechanical loadings and at the same time can be provided in adhesive form. In that case the fluctuating centrifugal forces which can act on the winding 6 at different generator speeds of rotation can give rise to shearing forces which the insulating means should be able to carry.

In that respect it is also to be noted that weld pimples can occur on a pole assembly 4 due to the production process, and they can penetrate through the insulating material and as a result can produce a conducting connection between the pole assembly 4 and the winding 6. Such a slightly conducting connection can lead to spark-over phenomena between the pole assembly 4 and the winding 6, which would then widen the connection so that insulation would no longer exist. Therefore an advantageous insulating material is a material like for example the aramid paper whose mechanical stability can withstand even such punctiform and acute loadings like weld pimples, with the insulating material being of a suitable thickness.

Production of a pole shoe with an insulating means which has a resin-impregnated or adhesive-coated aramid paper can be effected as follows:

Firstly the pole assembly 4 of the pole shoe is to be produced from metal plates. In that case those plates can be held together by the longitudinal pin 7 or also by way of other measures and means. As a further step, the aramid paper is to be cut to size to be adapted to the geometry of the pole assembly 4 and the winding 6. Then the aramid paper is to be impregnated with the resin or coated with an adhesive and possibly left to dry so that the resin or adhesive remains adhering in or on the paper. For that purpose the impregnated aramid paper can also be compressed with heating to achieve a desired geometry. In that respect, it is possible also to achieve a small thickness for the aramid paper, by virtue of compressing it. In addition that also makes it possible to impart to the aramid paper a stable geometry with for example angled edges in the longitudinal direction A in order to achieve a U-shaped profile for the insulating means, whereby the winding 6 can be accommodated in the U-shaped insulating means and thus a corresponding geometry can be partially or completely implemented for the pole assembly 4 and the side portion 5, that is to say with projecting edges for accommodating the winding 6.

The aramid paper is then placed as the insulating material around the flanks of the pole assembly 4. Insulation can be afforded by the element 1 at the ends of the pole assembly 4. The winding 6 is then wound around and onto the adhesive aramid paper so that the windings adhere to the aramid paper which in turn adheres to the pole assembly 4.

Figure 5:
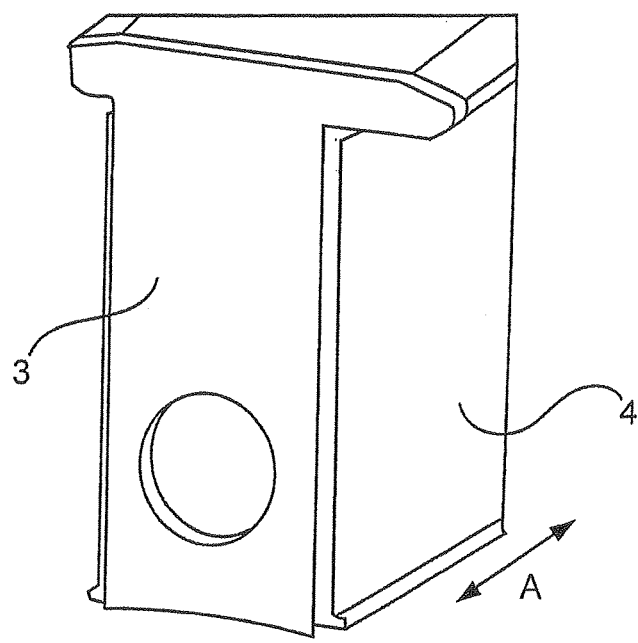
FIG. 5 shows a first perspective detail view of an end of the pole shoe.

FIG. 5 shows a first perspective detail view of an end of the pole shoe according to one embodiment. It shows the pole assembly 4 with a recess extending in the longitudinal direction A, into which the longitudinal pin 7 can be inserted (not shown). Fitted onto the end of the pole assembly 4 is a first element 3 which is to be referred to as an additional assembly 3. The additional assembly 3 is of a configuration adapted to the geometry of the pole assembly 4 and represents the outermost plate of the pole assembly 4. The additional assembly 3 however also has at the same time laterally a recess such that the element 3, that is to say the edge rounding configuration 1 (see FIGS. 8 to 11d) can be fitted over that edge of the additional assembly 3. In other words, the additional assembly 3 is not of a configuration adapted to the arrow configuration of the pole assembly 4.

Figure 6:
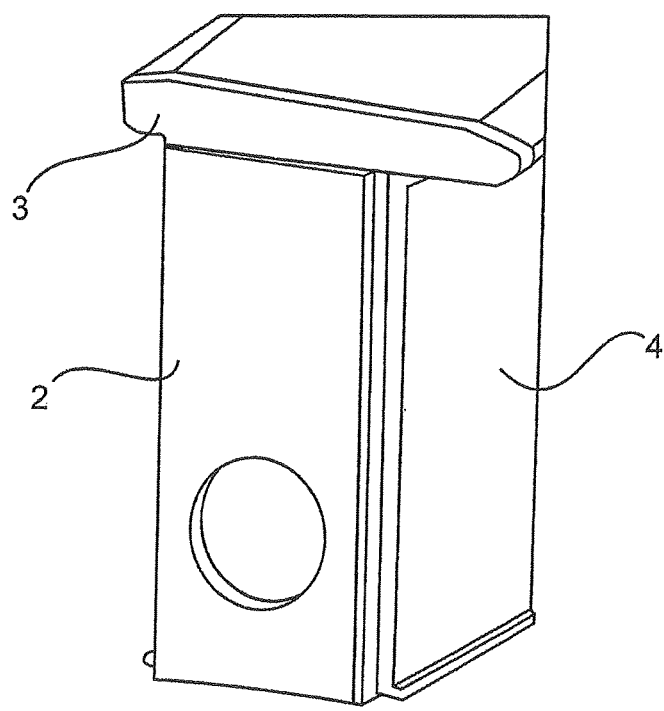
FIG. 6 shows a second perspective detail view of an end of the pole shoe.

FIG. 6 shows a second perspective detail view of an end of the pole shoe. Fitted onto the additional assembly 3 is a second element 2 which is to be referred as the pressure portion 2. The pressure portion 2 is adapted to the geometry of the additional assembly 3, wherein the pressure portion 2 is shorter in the upper region than the additional assembly 3 so that the additional assembly 3 is shown as protruding beyond the pressure portion 2. As a result the pressure portion 2 stands out in the upper region from the subjacent additional assembly 3 so that the edge rounding configuration 1 can be fitted over the pressure portion 2 both laterally and also in the upper region.

Figure 7:
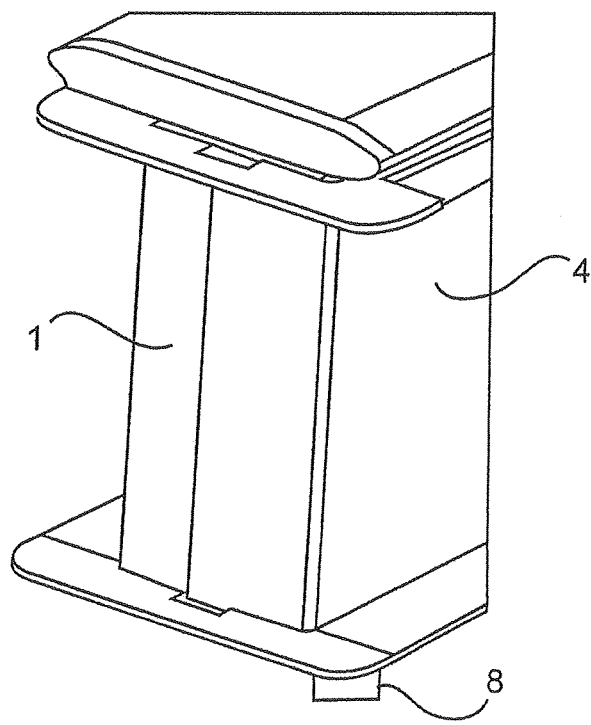
FIG. 7 shows a third perspective detail view of an end of the pole shoe.

FIG. 7 shows a third perspective detail view of an end of the pole shoe. In this variant the longitudinal pin 7 has been inserted into the recess which passes in the same manner through both the plates of the pole assembly 4 and also the additional assembly 3 and the pressure portion 2. In that way the plates of the pole assembly 4, the additional assembly 3 and the pressure portion 2 are held together by the longitudinal pin 7. In that case the longitudinal pin 7 centers the additional assembly 3 and the pressure portion 2. The pressure portion 2 is welded to the longitudinal pin 7 for securing the structure.

Figure 8:
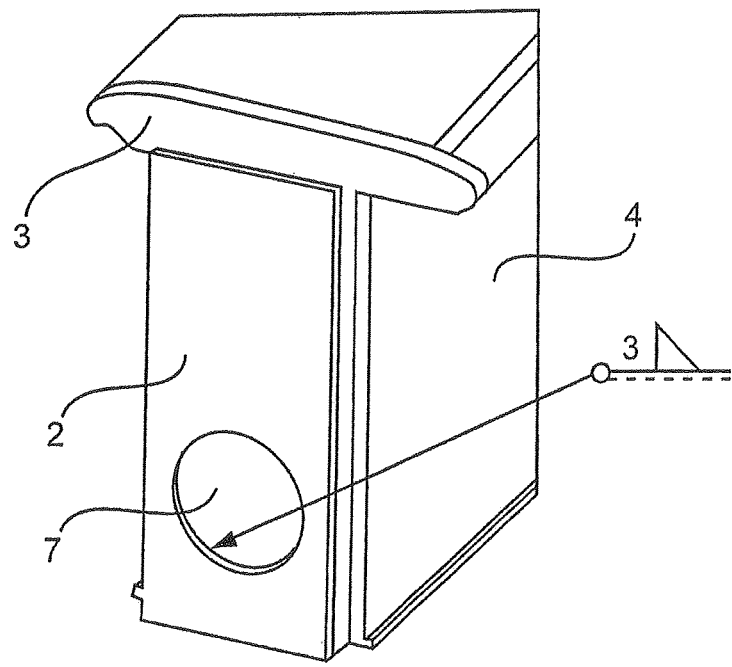
FIG. 8 shows a fourth perspective detail view of an end of the pole shoe.

FIG. 8 shows a fourth perspective detail view of an end of the pole shoe. In this view the end is closed off by means of a third element 1 which is to be referred as the edge rounding configuration member 1. That termination by means of the edge rounding configuration member 1 makes it possible to provide a flat smooth surface for the pole assembly 4 so that the windings 6 can also bear smoothly and securely against the two ends of the pole assembly 4. In other words the edge rounding configuration member 1 prevents damage to the winding 6, which could occur due to sharp edges or bends in the support under the winding 6, that is to say at the end elements 1, 2, 3 of the pole assembly 4. In that respect for example the weld connection between the pressure portion 2 and the longitudinal pin 7 is concealed by the edge rounding configuration member 1.

The insulating means can also be provided around the pole assembly 4, that is to say over the edge rounding configuration member 1, so that it is also possible to avoid damage to the insulating means by a smooth edge rounding configuration member 1. Alternatively or additionally the edge rounding configuration member 1 itself can be of an insulating material so that the insulating material can optionally be omitted in that region to save on material and time in manufacture.

Figure 9:
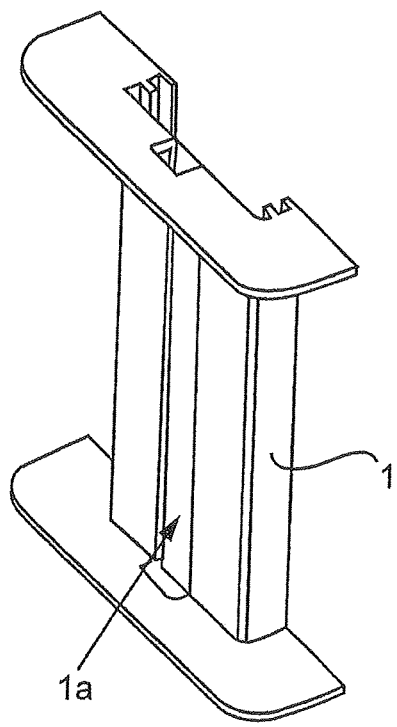
FIG. 9 shows a perspective detail view of an edge rounding from the front in a first embodiment.
Figure 10:
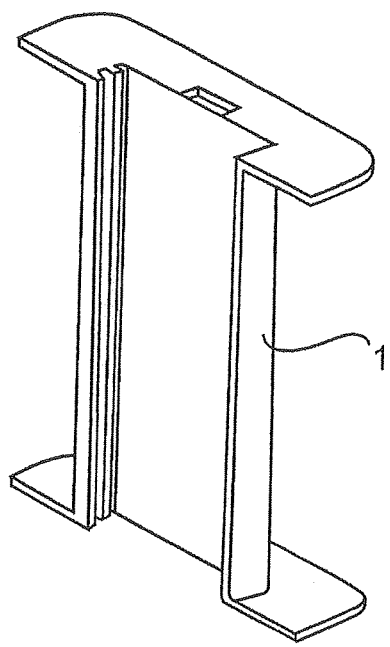
FIG. 10 shows a perspective detail view of an edge rounding from the rear in the first embodiment.

FIG. 9 shows a perspective detail view of an edge rounding configuration member 1 from the front in a first embodiment. FIG. 10 shows a perspective detail view of an edge rounding configuration member 1 from the rear in the first embodiment.

It is to be seen in that respect that the edge rounding configuration member 1 is of such a configuration that it can laterally completely enclose the additional assembly 3 and the pressure portion 2 in order to give a flat smooth surface in relation to the insulating means and the winding 6. The edge rounding configuration member 1 also has edges which project at top and bottom in order to be able to hold the winding 6 in those directions, for example in relation to centrifugal forces which occur in the rotational mode of operation. The edge rounding configuration member 1 also has a recess 1a in which a band can be guided to adjust the end of the winding 6.

In that respect according to one embodiment of the invention there is provided the combination of the elements 1, 2, 3, that is to say the additional assembly 3, the pressure portion 2 and the edge rounding configuration member 1. Hitherto it was known to provide a head portion in order to close off the end of the laminated pole assembly 4. In that respect hitherto no longitudinal pin 7 was used and instead the laminated pole assembly 4 was fastened to the support 9 with a plurality of smaller transverse bolts 8.

If however a longitudinal pin 7 is provided to hold the plates of the pole assembly 4 together and to serve as a fastening for few but thicker transverse bolts 8, the longitudinal pin 7 can project beyond the outermost plate of the pole assembly 4 and in that case may be fixed there. If an end portion is fitted onto that extension of the pole assembly 4 the weight and length of the pole shoe are detrimentally increased. For example an end portion of a thickness of 26 mm would be fitted onto the end of the pole assembly 4.

According to one or more embodiments of the invention therefore there is provided a combination of a plurality of elements 1, 2, 3 at the end of the pole assembly 4, as the end portion. The additional assembly 3 as the outermost plate of the pole assembly 4 is for example 18 mm in thickness. The additional assembly 3 corresponds to a plate of the pole assembly 4 with a lateral recess for receiving the edge rounding configuration member 1. The pressure portion 2 is for example 6 mm in thickness and serves for fixing the longitudinal pin 7. The edge rounding configuration member 1 is for example 3 mm in thickness and rounds off the end of the pole assembly 4. The head portion 1, 2 according to the invention of the pole assembly 4 is of an overall thickness of 9 mm by virtue of the arrangement of the edge rounding configuration member 1 over the pressure portion 2.

That reduction in the thickness of the head portion provides a saving in material in relation to the previous head portion, and that has an effect on the copper used as the previous head portion was made of copper. In that respect, for each pole shoe, it is possible to achieve a material saving in respect of the pole shoe being considered in a generator of a wind power installation, of 2.31 kg. With 72 pole shoes, it is possible in that way to save 166.3 kg of copper.

Figure 11A:
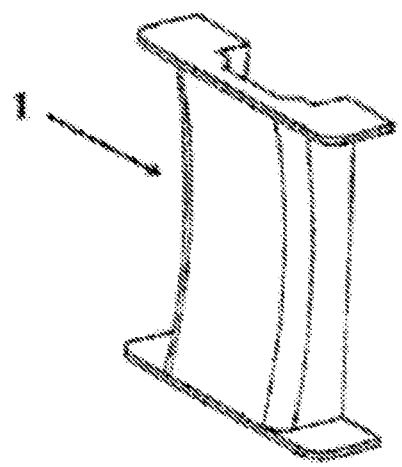
FIG. 11a shows a perspective detail view of an edge rounding 1 from the front in a second embodiment.
Figure 11B:
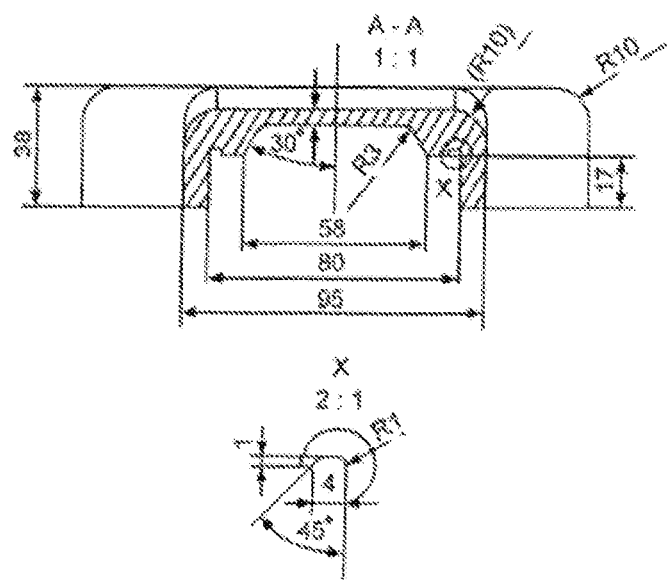
FIG. 11b shows a plan view of an edge rounding 1 in the second embodiment.
Figure 11C:
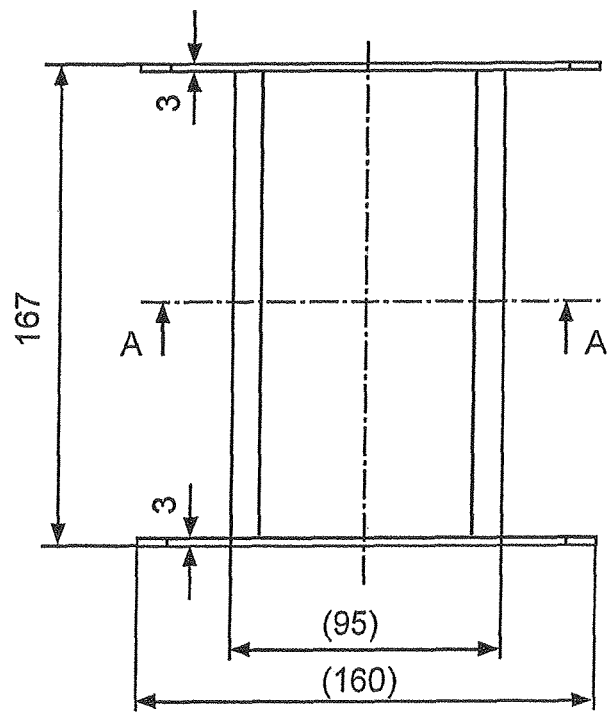
FIG. 11c shows a front view of an edge rounding 1 in the second embodiment.
Figure 11D:
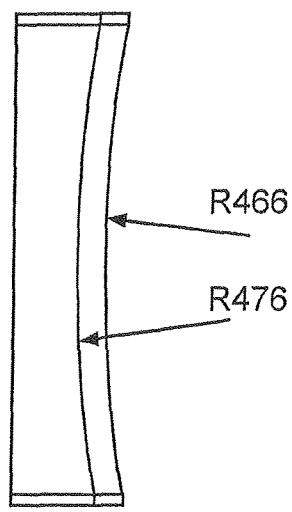
FIG. 11d shows a detail view of an edge rounding 1 in the second embodiment.

FIG. 11a shows a perspective detail view of an edge rounding configuration member 1 from the front in accordance with a second embodiment. FIG. 11b shows a plan view of the edge rounding configuration member 1 in the second embodiment. FIG. 11c shows a front view of an edge rounding configuration member 1 in the second embodiment. FIG. 11d shows a detail view of an edge rounding configuration member 1 in the second embodiment. FIGS. 11b, 11c, and 11d illustrate various dimensions, including radius (R), for the elements of the edge rounding configuration member, which are shown in millimeters.

In this second embodiment the edge rounding configuration member 1 has an inwardly curved portion, that is to say the edge rounding configuration member 1 is of a concave configuration such that it can accommodate the winding 6 in the recess of the concavity. In that way it is possible to counteract displacement of the winding 6 with respect to the edge rounding configuration member 1, which can occur due to centrifugal forces upon rotation of the pole shoe, for example on the rotor of a generator.

The geometry of the edge rounding configuration member 1 provides that the winding 6 is held in the recess of the concave surface even if the winding 6 expands due to heat and is arranged around the pole assembly 4 more loosely than in the cooled and tightened condition.

In contrast there would be the risk on a flat surface that the winding 6 would gradually move downwardly from the pole assembly 4, for example due to repetitive expansion upon heating and contraction upon cooling, with centrifugal forces occurring at the same time. It is possible to counteract that situation by the concave configuration of the edge rounding configuration member 1. In that respect, that design configuration is supplemented with the adhesive connection of the winding 6 in relation to the pole assembly 4 by means of the adhesive insulating means and the U-shaped configuration of the side portion 5 which, by virtue of its also concave configuration, has a comparable effect at the sides of the pole shoe as the above-described concave configuration of the edge rounding configuration member 1 at the ends of the pole shoe.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pole shoe of a generator, the pole shoe comprising:
   a pole assembly that includes laminated materials;
   at least one winding arranged around the pole assembly; and
   an end portion provided at an end of the pole assembly and located between the pole assembly and the winding, wherein the end portion has an outer surface that is concave shaped, the winding located in the concave shape of the outer surface of the end portion, wherein the end portion has rounded edges that provide an edge free transition between the end portion and the pole assembly.

2. The pole shoe according to claim 1 further comprising a side portion located over the winding, wherein at least one of the end portion and the side portion has at least one projecting edge extending parallel to the winding.

3. The pole shoe according to claim 1 wherein the end portion is coupled to the pole assembly by a pressure portion.

4. A generator comprising:
a pole shoe according to claim 1.

5. A wind power installation comprising:
a generator according to claim 4, the generator comprising:
   a stator; and
   a rotor, wherein the support to which the pole shoe is fastened is part of the stator or the rotor.

6. The pole shoe according to claim 1 further comprising an insulating means arranged between the pole assembly and the winding, wherein the insulating means produces an adhesive connection between the pole assembly and the winding.

7. The pole shoe according to claim 6 wherein the insulating means has at least one of a fiber composite material and a glass fiber-reinforced plastic.

8. The pole shoe according to claim 7 wherein the insulating means is a fiber composite material and the fiber composite material has meta aramid fibers.

9. The pole shoe according to 1 further comprising a body that passes through the pole assembly in a longitudinal direction and has a plurality of transversely directed engagement locations into which a respective holding means can engage to fasten the pole shoe to a support.

10. The pole shoe according to claim 9 wherein the plurality of transversely directed engagement locations are at most three engagement locations, wherein at least two of the engagement locations are provided at the ends of the pole assembly.

11. The pole shoe according to claim 10 wherein a third engagement location is provided at the center of the pole assembly.

12. The pole shoe according to claim 9 wherein the plurality engagement locations are so provided that heat can be discharged from the pole shoe to at least one cooling region in the support by way of the surfaces of the pole shoe between the engagement locations.

13. The pole shoe according to claim 9 wherein the holding means are screws.

14. The pole shoe according to claim 9 wherein the body is a cylindrical pin.

\* \* \* \* \*